Patented Oct. 25, 1932

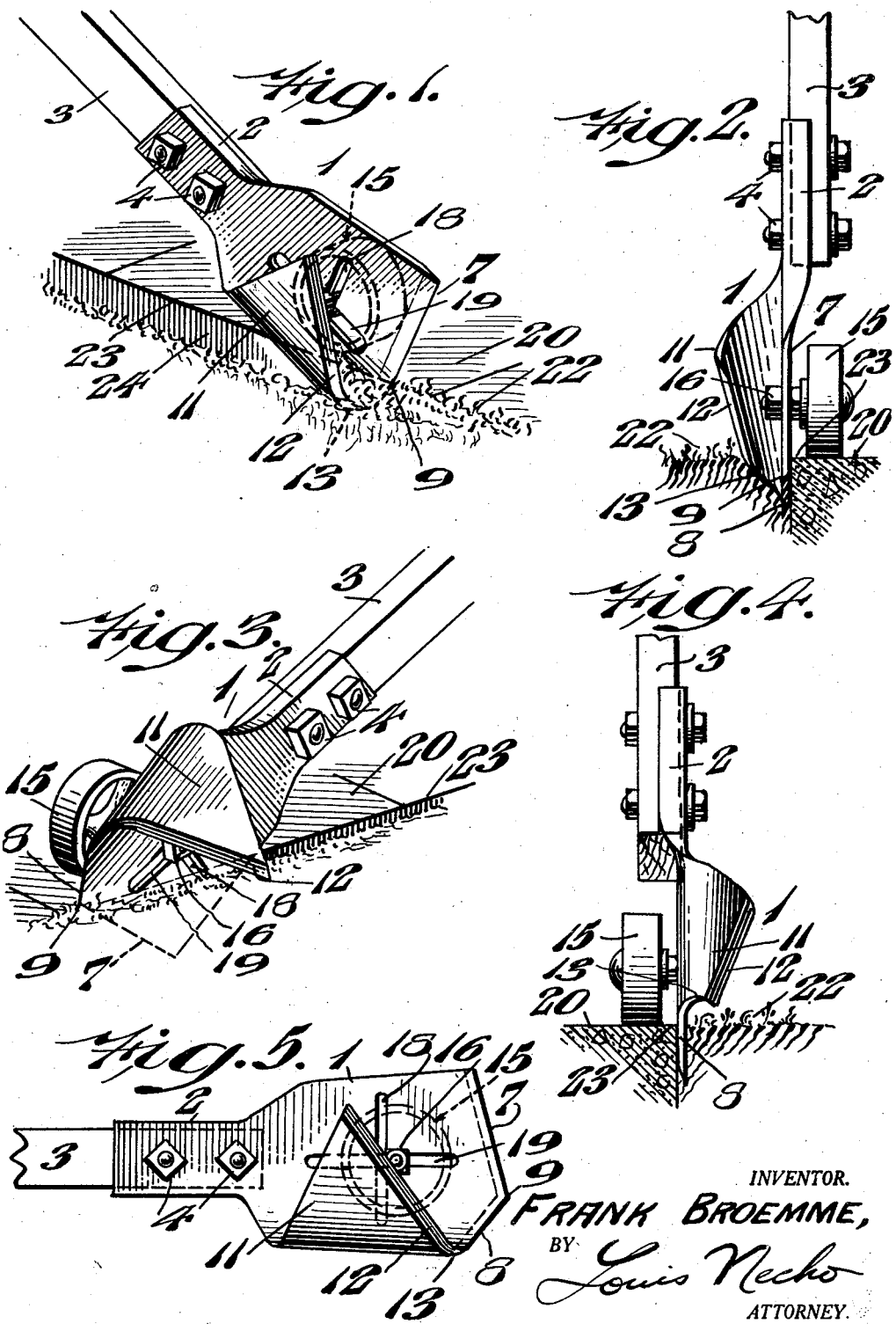

1,885,073

UNITED STATES PATENT OFFICE

FRANK BROEMME, OF PALMYRA, NEW JERSEY

GRASS CUTTING DEVICE

Application filed April 12, 1932. Serial No. 604,684.

My invention relates to a new and useful grass cutting device and it relates more specifically to a device adapted to cut the grass along the borders or edges of a lawn or at the junction of such lawn with a paved surface, such as a sidewalk or the like, this device being commonly known and referred to as an "edger" or "trimmer".

The conventional lawn mower employing spaced rollers between which is interposed one or more cutting blades is only adapted to cut the grass on the flat surface on a lawn or similar area over which the mower can be pulled or pushed. However, at the peripheral edges of a lawn where such lawn meets an edge or a sidewalk or other unplanted area the conventional lawn mower is useless since it is unwieldy and cannot be so manœuvred as to produce a neat trimming of the edge of the lawn.

Devices have heretofore been made for trimming the edge of a lawn under the above outlined circumstances, but such devices have been of a complicated construction involving various supports, rotary cutters, etc., so that their cost, considering the small use to which they are put, was prohibitive. It is, therefore, the object of my invention to produce a device which is extremely simple and the parts of which constitute an irreducible minimum, which device will serve to trim the edges of a lawn and which is reversible in its nature to cut the grass from a peripheral level surface or from a small gutter or groove which usually exists between the edge of a lawn and the contiguous hedge, paved surface, or the like.

My invention still further relates to a device of this character which is readily adjustable to accommodate various spacings or inequalities in level of the lawn to be trimmed and the nonplanted edges and area, my device being easily sharpened without the necessity of dismantling any of the parts and being adapted to be assembled and dismantled in minimum time and with minimum effort.

My invention still further relates to a single grass cutting device which is adapted to cut the grass on a flat or level surface, as well as in a groove, gutter or other depression, without in any way adding to or changing the structure of the device, it being merely necessary to reverse the direction of travel thereof.

To the above ends, my invention consists of a blade having converging cutting edges meeting at a front point, one side of said blade being folded over upon but not contiguous with the juxtaposed portion of the blade to form a substantially U-shaped arrangement, the entire blade being permanently secured to a suitable handle and carrying a supporting and guiding roller or wheel in a vertically and horizontally adjustable manner.

In the accompanying drawing:

Figure 1 represents a perspective view of my novel grass cutting device shown in actual use in cutting grass from a groove or gutter.

Figure 2 is a front elevation of Figure 1.

Figure 3 is a view similar to Figure 1 showing my novel grass cutting device in actual use in cutting grass from a level surface.

Figure 4 is a front elevation of Figure 3.

Figure 5 is a side elevation of Figure 1 showing details of construction.

Referring to the drawing in which like reference characters indicate like parts, 1 designates a blade, having the rear extension 2, secured to a wooden or other handle 3 by the bolts and nuts 4. The blade 1 is provided with the converging cutting edges 7 and 8 which meet at the front point 9. 11 designates an extension of the blade 1 which is folded over the blade 1 to form a generally U-shaped construction, as will be seen from all of the figures of the drawing, said extension being provided with the cutting edge 12 which merges with the cutting edge 8 at the point 13. 15 designates a roller which is secured to the blade 1 by the bolt and nut arrangement 16 and is adjustable vertically and horizontally with respect to the blade 1 in the vertical and horizontal slots 18 and 19 respectively, as will be best seen from Figures 1 and 5.

The operation is as follows: With the roller 15 riding on the paved surface 20, which may be a sidewalk, or the like, the point 13 at which the cutting edges 8 and 12 meet forms a U-shaped scoop which serves to cut the grass 22 at a level below the edge 23 of the paved area 20 to form a groove or gutter alongside the vertical edge 24 of the paved area 20, as best seen in Figures 1 and 2. If it is not desired to cut a groove or gutter in the manner shown in Figures 1 and 2, my novel grass cutting device is reversed and used in the manner illustrated in Figure 3 wherein the cutting edge 7 alone is used to cut the grass thus resulting in trimming the edge of the lawn adjacent the vertical edge 24 of the paved area 20 without making a groove or gutter produced when the device is used as illustrated in Figures 1 and 2. The position of the roller 15 which supports the blade 1 during the cutting operation is adjusted or regulated by manipulating the bolt 16 in the adjustment slots 18 and 19 according to the prevailing requirement as to the depth of the groove to be cut or the position of the lawn or grass with respect to the paved area 20.

It will thus be seen that I have devised an extremely simplified form of grass cutter which efficiently and effectively cuts the grass either on a straight level surface, such as shown in Figure 3, or in a grooved or depressed surface, such as shown in Figures 1 and 2, by merely reversing the direction of travel of the device. It will also be seen that the cutting edges 7, 8 and 12 can be sharpened without the necessity of dismantling the device and that the device can be adjusted both vertically and horizontally by the mere manipulation of a single bolt and nut. I also wish to point out that my device can be made from a single sheet metal stamping, thus reducing the cost of manufacture, distribution and maintenance.

Having thus described my invention, what I claim as new and desire to secure by Letters Patent is:

A reversible grass cutting device for trimming a wall or the like contiguous with an edge of an adjacent implanted area to cut a straight edge or a groove, comprising a substantially U-shaped body portion, one of the limbs of said U-shaped body portion having a rearwardly inclined front cutting edge, the other of said limbs being formed to present rearwardly diverging upper and lower front cutting edges, the lower of said last mentioned cutting edges merging with and coacting with said first mentioned cutting edge to cut a groove and the upper of said edges serving to cut a straight edge depending on the direction of travel of the cutting device, and a roller for supporting said cutting device, there being intersecting slots in said body portion for permitting vertical and horizontal adjustment of said roller with respect to said body portion.

In testimony whereof, I affix my signature.

FRANK BROEMME.